United States Patent
Lachterman

(10) Patent No.: US 9,276,915 B2
(45) Date of Patent: *Mar. 1, 2016

(54) PRIVACY SYSTEM

(71) Applicant: UThisMe, LLC, Hudson, NY (US)

(72) Inventor: Seth Lachterman, Hillsdale, NY (US)

(73) Assignee: UThisMe, LLC, Hudson, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,262

(22) Filed: Apr. 22, 2015

(65) Prior Publication Data

US 2015/0229615 A1    Aug. 13, 2015

Related U.S. Application Data

(63) Continuation of application No. 14/564,702, filed on Dec. 9, 2014, which is a continuation of application No. 13/995,815, filed as application No. PCT/US2012/007031 on Dec. 18, 2012, now Pat. No. 8,935,531.

(60) Provisional application No. 61/577,323, filed on Dec. 19, 2011.

(51) Int. Cl.
*H04L 29/06* (2006.01)
*H04W 12/02* (2009.01)
*H04L 12/58* (2006.01)

(52) U.S. Cl.
CPC ............ *H04L 63/0428* (2013.01); *H04L 51/32* (2013.01); *H04W 12/02* (2013.01)

(58) Field of Classification Search
CPC combination set(s) only.
See application file for complete search history.

(56) References Cited

U.S. PATENT DOCUMENTS

| | | | |
|---|---|---|---|
| 5,479,511 A | 12/1995 | Naccache |
| 6,038,549 A | 3/2000 | Davis et al. |
| RE37,178 E | 5/2001 | Kingdon |
| 6,912,658 B1 | 6/2005 | Glogau et al. |
| 7,167,825 B1 | 1/2007 | Potter |
| 7,356,463 B1 | 4/2008 | Isabelle |
| 7,646,868 B2 | 1/2010 | Vaughn |
| 2004/0205457 A1 | 10/2004 | Bent et al. |
| 2004/0260921 A1 | 12/2004 | Treadwell |

(Continued)

OTHER PUBLICATIONS

Dada, Office Action Communication for U.S. Appl. No. 14/564,702 dated May 21, 2015, 14 pages.

(Continued)

*Primary Examiner* — Beemnet Dada
(74) *Attorney, Agent, or Firm* — Hoffman Warnick LLC

(57) ABSTRACT

The disclosure relates generally to mobile device applications, and more particularly, to a privacy system for a mobile device application. In one embodiment, a computer-implemented method of sending and receiving encrypted messages between users within an associated group of users is provided. The method includes: receiving a first message from a first user within the group of users, wherein the first message includes proprietary information; encrypting the first message into ciphertext; transforming the ciphertext into a second message, wherein the second message includes quotidian information; and sending the second message to a second user within the group of users. Once the second user receives the second message, the second user will assay the second message to be an encryption of an unknown first message. The second message is received from the second user, and is decrypted into the first message, which is displayed to the second user.

17 Claims, 2 Drawing Sheets

(56) References Cited

U.S. PATENT DOCUMENTS

| | | | |
|---|---|---|---|
| 2007/0086587 A1* | 4/2007 | Farahat et al. | 380/28 |
| 2007/0266095 A1 | 11/2007 | Billsus et al. | |
| 2008/0189292 A1 | 8/2008 | Stremel et al. | |
| 2009/0046848 A1 | 2/2009 | Booth | |
| 2011/0167255 A1 | 7/2011 | Matzkel et al. | |
| 2011/0271093 A1 | 11/2011 | McKenna | |

OTHER PUBLICATIONS

Patent Cooperation Treaty, Notification of Transmittal of the International Search Report and the Written Opinion of the International Searching Authority for PCT Application No. PCT/US2012/070311, dated Feb. 15, 2013, 10 pages.

Chapman, "Hiding the Hidden: A Software System for Concealing Ciphertext as Innocuous Text", The Univeristy of Wisconsin Milwaukee, May 1997, 83 pages.

Dada, Notice of Allowance and Fee(s) Due for U.S. Appl. No. 13/995,815 dated Oct. 7, 2014, UTHI-0001-US, 19 pages.

European Patent Office, Extended Search Report for EP Application EP12859586.5 mailed Sep. 24, 2015, 8 pages.

Patent Cooperation Treaty, Notification Concerning Transmittal of International Preliminary Report on Patentability for PCT/US2012/070311 dated Jun. 24, 2015, 6 pages.

\* cited by examiner

PRIVACY SYSTEM

REFERENCE TO RELATED APPLICATIONS

The current application is a continuation of pending application Ser. No. 14/564,702, filed Dec. 9, 2014, which is a continuation of Ser. No. 13/995,815, filed Jun. 19, 2013, which claims the benefit of co-pending PCT Application PCT/US2012/07031 filed on Dec. 18, 2012, which claimed the benefit of U.S. Provisional Application No. 61/577,323, which was filed on Dec. 19, 2011, all of which are titled "PRIVACY SYSTEM" and hereby incorporated by reference.

TECHNICAL FIELD

The disclosure relates generally to mobile device applications, and more particularly, to a privacy system for a mobile device application.

BACKGROUND ART

Currently, mobile communication systems provide for the transmission of short data messages between mobile devices via a message protocol. For example, many mobile communication systems allow for mobile devices to send and receive short data messages via a short message service (SMS).

As the use of mobile devices becomes increasing popular in a business environment, it is becoming increasingly desirable to users of such communications systems and mobile devices to be able to send and receive messages without revealing any private or proprietary information that may be sensitive to the business, and detrimental to the business, if revealed. Further, users may find it useful to hide personal messages that are sent from, or received on, a mobile device.

SUMMARY OF THE INVENTION

Aspects of the invention provide a method of sending and receiving encrypted messages between users within an associated group of users. In one embodiment, a method includes: receiving a first message from a first user within the group of users, wherein the first message includes proprietary information; encrypting the first message into ciphertext; transforming the ciphertext into a second message, wherein the second message includes quotidian information; and sending the second message to a second user within the group of users. Once the second user receives the second message, the second user will assay the second message to be an encryption of an unknown first message. The second message is received from the second user, and is decrypted into the first message, which is displayed to the second user.

A first aspect of the invention provides a computer-implemented method of exchanging private messages between users within an associated group of users, the method comprising: receiving a first message from a first user within the group of users, wherein the first message includes private information; encrypting the first message into ciphertext; transforming the ciphertext into a second message, wherein the second message includes a quotidian message comprising mundane content unrelated in meaning and relevance to the first message; and outputting the second message to a second user within the group of users.

A second aspect of the invention provides a computer program comprising program code embodied in at least one computer-readable medium, which when executed, enables a computer system to implement a method of exchanging private messages between users within an associated group of users, the method comprising: receiving a first message from a first user within the group of users, wherein the first message includes private information; encrypting the first message into ciphertext; transforming the ciphertext into a second message, wherein the second message includes a quotidian message comprising mundane content unrelated in meaning and relevance to the first message; and outputting the second message for a second user within the group of users.

A third aspect of the invention provides a computer system having a processor and memory for exchanging private messages between users within an associated group of users wherein the computer system is operable to: receive a first message from a first user within the group of users, wherein the first message includes private information; encrypt the first message into ciphertext; transform the ciphertext into a second message, wherein the second message includes a quotidian message that lacks a relevant relationship with the first message; store the second message and the ciphertext as a linked pair; and output the second message for a second user within the group of users.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a method of sending and receiving encrypted messages between users within an associated group of users. As used herein, unless otherwise noted, the term "set" means one or more (i.e., at least one) and the phrase "any solution" means any now known or later developed solution.

As mentioned previously, mobile communication systems currently provide for the transmission of short data messages between mobile devices via a message protocol. For example, many mobile communication systems allow for mobile devices to send and receive short data messages via a short message service (SMS).

As the use of mobile devices becomes increasing popular in a business environment, it is becoming increasingly desirable to users of such communications systems and mobile devices to be able to send and receive messages without revealing any private or proprietary information that may be sensitive to the business, and detrimental to the business, if revealed. Further, users may find it useful to hide personal messages that are sent from, or received on, a mobile device.

Aspects of the invention provide a method of sending and receiving encrypted messages between users within an associated group of users. In one embodiment, a method includes: receiving a first message from a first user within the group of users, wherein the first message includes proprietary information; encrypting the first message into ciphertext; transforming the ciphertext into a second message, wherein the second message includes quotidian information; and sending the second message to a second user within the group of users.

Figure 1:
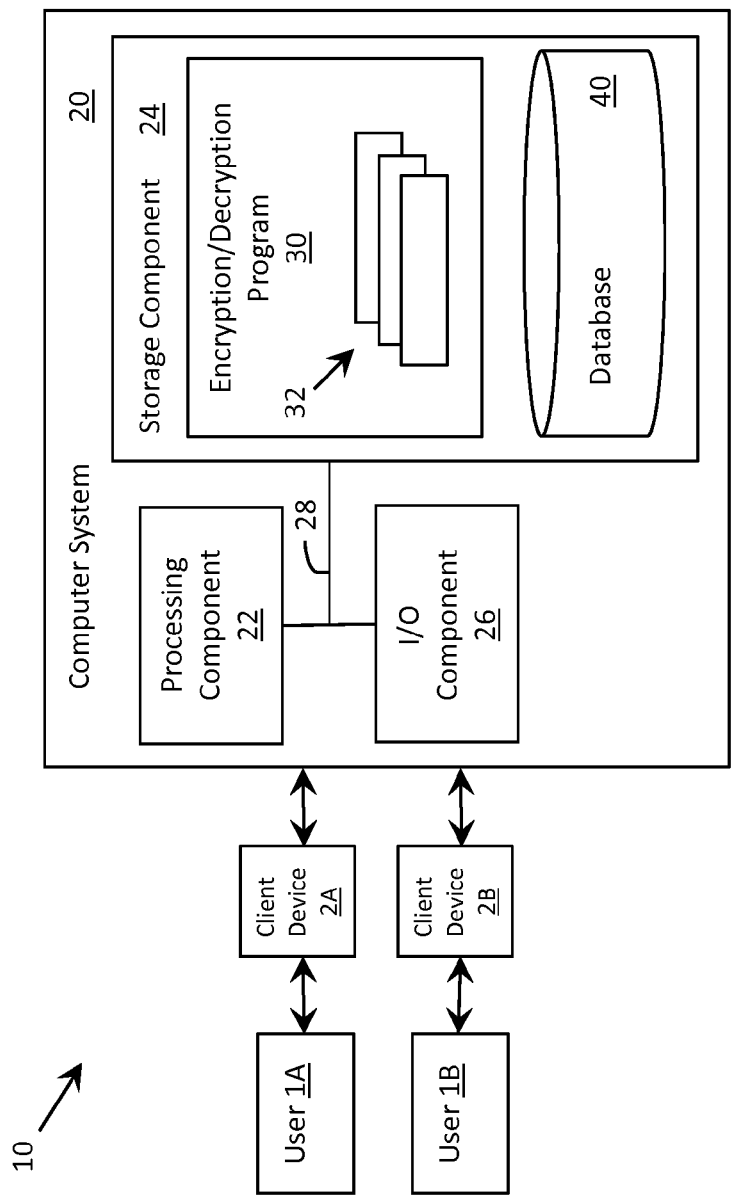
FIG. 1 shows an illustrative environment for sending and receiving encrypted messages between users according to embodiments of the invention.

Turning to the drawings, FIG. 1 shows an illustrative environment 10 for sending and receiving encrypted messages according to embodiments of the invention. To this extent, environment 10 includes a computer system 20 that can perform a process described herein in order to send and receive encrypted messages. In particular, computer system 20 is shown including an encryption/decryption program 30, which makes computer system 20 operable to send and receive encrypted messages by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as encryption/decryption program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a plurality of users 1A, 1B to interact with computer system 20 and/or one or more communications devices to enable a system user 1A, 1B to communicate with computer system 20 using any type of communications link. To this extent, encryption/decryption program 30 can manage a set of interfaces (e.g., graphical user interface(s), application program interface, and/or the like) that enable human and/or system users 1A, 1B to interact with encryption/decryption program 30. Further, encryption/decryption program 30 can manage (e.g., store, retrieve, create, manipulate, organize, present, etc.) the data, such as data in database 40, using any solution.

In any event, computer system 20 can comprise one or more general purpose computing articles of manufacture (e.g., computing devices) capable of executing program code, such as encryption/decryption program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, encryption/decryption program 30 can be embodied as any combination of system software and/or application software.

Further, encryption/decryption program 30 can be implemented using a set of modules 32. In this case, a module 32 can enable computer system 20 to perform a set of tasks used by encryption/decryption program 30, and can be separately developed and/or implemented apart from other portions of encryption/decryption program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of encryption/decryption program 30 fixed thereon (e.g., one or more modules 32). However, it is understood that computer system 20 and encryption/decryption program 30 are only representative of various possible equivalent computer systems that may perform a process described herein. To this extent, in other embodiments, the functionality provided by computer system 20 and encryption/decryption program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, encryption/decryption program 30 enables computer system 20 to send and receive encrypted messages between users in an associated group of users.

It is understood that although only two users 1A, 1B are shown in FIG. 1, there may be any number of users in environment 10. As will be described herein, users 1A, 1B are associated together as a group of users. Further, although a message 4 (FIG. 2) is shown as being sent from user 1A to user 1B, it is understood that this is for exemplary purposes only and that message 4 may be sent from any user within an associated group of users.

To form an associated group of users (e.g., users 1A, 1B), a user, for example user 1A may create an account, via client device 2A, with encryption/decryption program 30. Client devices 2A, 2B may include any networked device, such as, but not limited to a mobile device (smartphone), tablet, computing device, etc. An account may be generated by supplying information associated with user 1A, such as an e-mail address, a mobile phone number, an address, and billing information. Once an account is created, user 1A may create a group of associated users (e.g., user 1B). A passphrase, an known in the art, is associated with this group of associated users. User 1A may create a unique passphrase, or encryption/decryption program 30 may randomly generate a passphrase. Additionally, user 1A may select to prepend or append a keyphrase to a quotidian message 8 (after encryption of message 4) to aid in user 1B being able to readily assay that a quotidian message 8 (FIG. 2) is an encryption of an unknown message (message 4). For example, user 1A may choose to prepend "HEY!" to the beginning of every quotidian message 8.

When forming the associated group of users, user 1A may select the method of transformation for encrypting messages (e.g., message 4 of FIG. 2), which includes proprietary information, into a quotidian (i.e., mundane, ordinary) message 8. As will be described later herein, user 1A may select a canonic transformation of a message 4 or a non-canonic transformation of a message 4. If a canonic transformation of message 4 is selected, the quotidian message 8 is based on several factors, such as a sentence type, a clause count, and/or a sentence mode. If a non-canonic transformation of message 4 is selected, the quotidian message 8 is based on a user-defined database of phrases (such as themes and/or phrases used in social networking sources).

Figure 2:
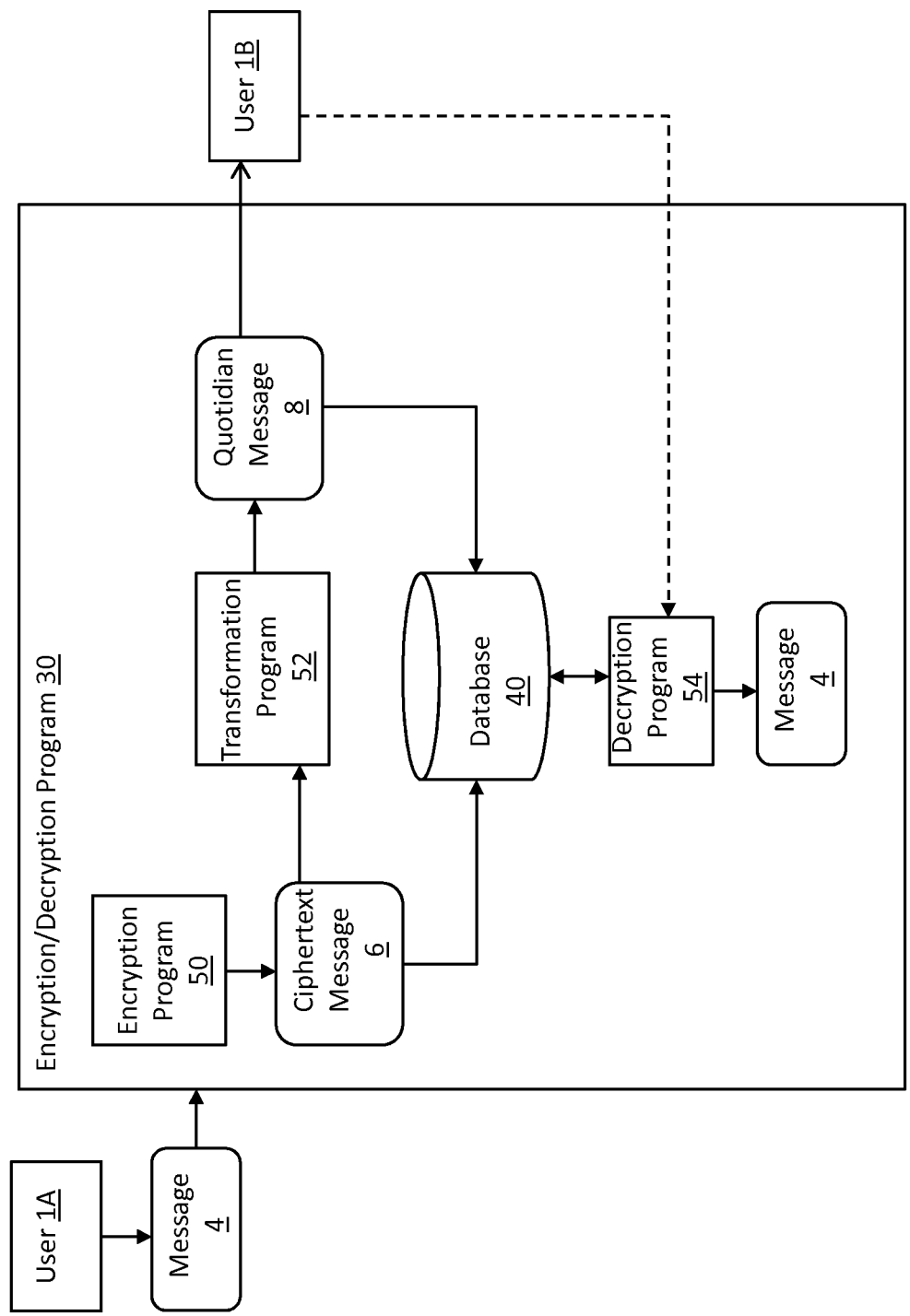
FIG. 2 shows a block diagram of an exemplary encryption/decryption program according to embodiments of the invention.

Turning now to FIG. 2, once user 1A creates an associated group of users (e.g., user 1B), user 1A may decide to send users within the associated group of users (user 1B) a message, i.e., message 4, that includes proprietary or secret information. User 1A sends message 4 (via client device 1A, FIG. 1) to encryption/decryption program 30. That is, user 1A may send message 4 via a mobile application on a mobile device, or via a website hosted on computing device, or any other method. Encryption program 50 receives this message 4, and encrypts message 4 into ciphertext message 6. For example, encryption program 50 may employ a Rijndael algorithm, as known in the art. However, any other now known or later developed algorithm for encrypting message 4 into a ciphertext message 6 may be used. In order to encrypt message 4 into ciphertext message 6, the passphrase associated with the group of users 1A, 1B is used in the algorithm. The message 4 that is sent from user 1A is not stored, however, the ciphertext message 6 is stored in database 40. In particular, the ciphertext message may be stored or associated with the generated quotidian message 8 in the database, e.g., as a "linked pair". Other information may likewise be stored with the linked pair, e.g., user information, etc.

Transformation program 52 receives the ciphertext message 6 and transforms the ciphertext message 6 into a quotidian message 8. That is, quotidian message 8 is a mundane, normal, non-proprietary message. There is no 1:1 or symmetric relationship between the encrypted ciphertext message 6 and the quotidian message 8. That is, there is no way to recover the encrypted ciphertext message 6 directly from the quotidian message 8. Further, the content of the quotidian message 8 is utterly different from the original proprietary message 4, e.g., containing nothing more than casual "chit-chat." The resulting quotidian message 8 appears as an innocuous, even trivial communication that is unrelated in meaning and relevance to the original proprietary message. Rather, for example, the quotidian message 8 may contain the semantic coherency of the sort of ubiquitous casual conversations found on mobile devices. So much so, the quotidian message 8 can be publically posted to such social networking sites such as Facebook and Twitter. For example, an original proprietary message may state:

"Bob—I have this great idea for an invention—let's meet at the usual coffee house tomorrow at 3 PM ok?"

The resulting quotidian message may then appear as:

"Hi—I haven't heard from you in a while. My new car is great—hope things are well at home—Alice"

As is evident, the original message 4 and quotidian message 8 are unrelated in meaning and relevance. Once generated, the quotidian message 8 is stored or associated with the ciphertext message 6 in database 40, and is then sent to the users within the associated group of users (e.g., user 1B). Members in the associated group who receive the message 8 will be able to discern whether a message is not a normal message, e.g., based on knowledge that the sender is a member of the group, the lack of context of the message, pre-agreed terms or phrases, etc.

In transforming ciphertext message 6 into quotidian message 8, transformation program 52 may employ a canonic transformation that uses canonic factors of message 4 for the transformation. For example, a sentence type, a clause count, and/or a sentence mode of message 4 may be used. The following describes an algorithm in transforming ciphertext message 6 into quotidian message 8.

Ciphertext message 6 is first converted and stored as an amplified Base-64 radix array of ASCII text. The array may be denoted as $\{b[\ldots i \ldots]\}$ where i assumes the index values of the array from $0 \ldots \text{length}(b)$. The amplified Base-64 character set includes 52 alphabetic characters, 10 numeric characters, with additional '+' '=' and '/'), with '−' added as a meta-character. The sequence is 'A', 'B', 'C', ... 'a', 'b', 'c', ... '0', '1', '2', ... '+' '−' '=', '/'. It merely adds two extra characters to the normal Base-64 array.

Transformation program 52 assumes $A[x]$ be an associative array mapping byte values (represented in amplified Base-64) to positional array indices (integers):

$A[\{`A` \rightarrow 0, `B` \rightarrow 1, `C` \rightarrow 2 \ldots\}]$

Thus, $A[0] \rightarrow `A`$ and $A[`A`] \rightarrow 0$.

The values of $\{b[i]\}$ may be mapped to an integer for any position i:

$A[b[i]] = j$ where $j \in \{0 \ldots 65\}$

Next, a function $F(i) \rightarrow j$ is defined, which gets a byte value of $b[\ ]$ at position i and returns a positional value j. With this function, the return values for these specific values. In Table 1 below, the return values for specific values provide the canonic factors.

TABLE 1

| Index | Operation |
|---|---|
| 0 | 0 < F(0) < 20 Declarative, |
|  | 21 < F(0) < 41 Interrogative |
|  | 42 < F(0) < 65: Exclamatory |
| 1 | 0 < F(1) < 20: Uni-Clausal |
|  | 21 < F{1} < 41: Bi-Clausal |
|  | 42 < F(1) < 65: Tri-Clausal |
| m = len(b) − 5 | 0 < F(m) < 20: Negative Modal |
|  | 21 < F{m} < 41: Zero Modal |
|  | 42 < F(m) < 65: Positive Modal |

Given these rules, transformation program 52 defines the following: i) The "canonic character" K of ciphertext 6 (for example, represented as array b[ ]) is the set of construction rules defined by the index triple {0,1,m}. Thus K(b[0,1,m]) determines the nature of an English language sentence according to the rules determined by the outcomes of the table above. The return of K(b[0,1,m]) is a Canonic Triple. ii) The function $S(K(b[0,1,m])) \rightarrow U$ takes a Canonic Triple and creates the quotidian message 8—i.e. a sentence in English constrained to 160 characters. The function S( ) is called the Transform Function. This function requires the following database component: iii) The function RDB(i,C_DB) retrieves UTM strings from a database of clauses. Namely, index i is the ith clause of a specific table within database 40. The table variants the specific table are customizable as to their "Mode" (i.e. "Negative," "Zero," "Positive"), and their sentence type (Declarative, Interrogative, and Exclamatory).

For example, for a message 4 that states "See me today—it's important!", a ciphertext 6 may be: "P/t3qjf4wkhVPUSOhZz35Eoe5AWynITRVHVaGszxtwc=". However, it is understood that the specific ciphertext 6 depends on the passphrase generated for the associated group of users or created by user 1A. The Cipher Text array is b[ . . . i . . . ] with values:

$b[0] = $ 'P' $F(b(0)) = 15$ (Sentence is Declarative)

$b[1] = $ '/' $F(b(1)) = 63$ (Sentence is Tri-Clausal)

$b[m] = $ 'x' $F(b(m)) = 49$ (Sentence is Positive Modal)

...

$b[43] = $ ' = '(the padding character in Base64)$F(b(43)) = 65$

Thus, the quotidian message 8 will be in three clauses (Tri-Clausal), Declarative and denoting a positive sense. The canonic character is defined as: 'TDP'. Thus, in this example, K returns a Canonic Triple: $K(b[0,1,m])=$'TDP'.

In converting ciphertext 6 to quotidian message 8, a triplet, such as "TDP" may yield: "I haven't heard from you. Things are okay with me these days. Hope to hear from you". In the quotidian message 8, there are three clauses, the sentences are declarative, and the sentence is positive in inflection or mode.

A user 1A may select a non-canonic transformation of message 4 into quotidian message 8. In this case, transformation of message 4 would be based on a user-defined database of phrases. That is, a user 1A may select a theme, such as, but not limited to, news, sports, economic markets, geographic and/or meteorological subjects, entertainment and media, and/or technology and science. Database 40 would include a plurality of tables that include phrases within these themes or topics. Alternatively, user 1A may select a database of automated messages from a social networking source that user 1A listed in creating the associated group of users. In another embodiment, quotidian message 8 may include a hyperlink that points user 1B to a website that stores the ciphertext 6 associated with quotidian message 8.

In receiving quotidian message 8, user 1B may receive quotidian message 8 in the form of a SMS message, which would be limited to 160 characters. Alternatively, user 1A may post quotidian message 8 to a social networking website, where user 1B (and any other user associated with the group of users) are able to view postings. Alternatively, user 1A may post quotidian message 8 to a Twitter® account, which is limited to 140 characters.

After user 1B receives quotidian message 8, user 1B may send the quotidian message 8 to decryption program 54. That is, user 1B may log into a mobile application on a mobile device (i.e., client device 2B) or a website. It is noted that user 1B will know, by assaying the quotidian message 8, that quotidian message 8 is not a "true" message. That is, based on prior knowledge of user 1A creating an associated group of users for sharing proprietary information, and knowledge of user 1A in general, user 1B will be able to ascertain that quotidian message 8 must be decrypted.

Decryption program 54 is able to receive and process the quotidian message 8 to obtain message 4. In particular, the receiving user (user 1B) can resubmit the quotidian message 8 back to the decryption program 54 (e.g., using a client program on a smartphone) which will then search the database 40 and retrieve the associated encrypted ciphertext message 6. The encrypted ciphertext message 6 will then be decrypted by decryption program 54 to generate the original message 4. However, it is understood that message 4 is only displayed for user 1B (via client device 2B) and is not sent to user 1B. Once the message 4 is viewed, the message 4 is deleted. In this way, proprietary messages may be sent from user 1A to user 1B, both privately and efficiently. Alternatively, encryption/decryption program 30 may be set to automatically delete the message 4 after user 1B has read message 4, or encryption/decryption program 30 may be set to allow user 1B to manually delete message 4 after he/she has read the message 4. Further, in initializing an account and/or an associated group of users, user 1A may be allowed to specify that encryption/decryption program 30 will automatically delete message 4 after user 1B has read message 4.

While shown and described herein as a method and system for sending and receiving encrypted messages, it is understood that aspects of the invention further provide various alternative embodiments. For example, in one embodiment, the invention provides a computer program fixed in at least one computer-readable medium, which when executed, enables a computer system to send and receive encrypted messages. To this extent, the computer-readable medium includes program code, such as encryption/decryption program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as encryption/decryption program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for sending and receiving encrypted messages. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to send and receive encrypted messages as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of exchanging private messages between users within an associated group of users, the method comprising:
    receiving on a social networking site a first message from a first client computing system associated with a first user within the group of users, wherein the first message includes private information;
    encrypting the first message into ciphertext;
    linking the ciphertext to a second message, wherein the second message includes a quotidian message comprising mundane content unrelated in meaning and relevance to the first message, and wherein the second message is stored and retrieved in its entirety from a database of messages having pre-defined themes; and
    outputting the second message to a second client computing system from the social networking site while maintaining the ciphertext exclusively in a storage component of the social networking site.

2. The computer-implemented method of claim 1, wherein the pre-defined theme is selected by the first user.

3. The computer-implemented method of claim 1, wherein the pre-defined theme is selected from the group consisting of: news, sports, economic markets, geographic and/or meteorological subjects, entertainment and media, technology and science.

4. The computer-implemented method of claim 1, wherein the second message is obtained from a database associated with a social networking source.

5. The computer-implemented method of claim 1, wherein the second message includes a hyperlink that points to a website that stores the ciphertext.

6. A computer program product comprising program code embodied in at least one non-transient computer-readable storage medium, which when executed, enables a computer system to exchange private messages between users within an associated group of users, the program code comprising:
    program code for receiving on a social networking site a first message from a first client computing system associated with a first user within the group of users, wherein the first message includes private information;
    program code for encrypting the first message into ciphertext;
    program code for linking the ciphertext to a second message, wherein the second message includes a quotidian message comprising mundane content unrelated in meaning and relevance to the first message, and wherein the second message is retrieved in its entirety from a database of messages having at least one pre-defined theme; and
    program code for outputting the second message on the social networking site.

7. The computer program product of claim 6, wherein the pre-defined theme is selected by a user.

8. The computer program product of claim 6, wherein the pre-defined theme is selected from the group consisting of: news, sports, economic markets, geographic subjects, meteorological subjects, entertainment and media, technology and science.

9. The computer program product of claim 6, wherein the second message is obtained from a database associated with a social networking source.

10. The computer program product of claim 6, wherein the second message includes a hyperlink that points to a website that stores the ciphertext.

11. A system for facilitating the exchange of private messages among users within an associated group of users, comprising:
    a system for receiving a first message on a social networking site from a first user within the group of users, wherein the first message includes private information;
    a system for encrypting the first message into ciphertext;
    a system for linking the ciphertext to a second message, wherein the second message includes a quotidian message comprising mundane content unrelated in meaning and relevance to the first message, and wherein the second message is retrieved from a database of messages having at least one pre-defined theme; and
    a system for outputting the second message from the social networking site.

12. The system of claim 11, wherein the pre-defined theme is selected by a user.

13. The system of claim 11, wherein the pre-defined theme is selected from the group consisting of: news, sports, economic markets, geographic subjects, meteorological subjects, entertainment and media, technology and science.

14. The system of claim 11, wherein the second message is obtained from a database associated with a social networking source.

15. The system of claim 11, wherein the second message includes a hyperlink that points to a website that stores the ciphertext.

16. The system of claim 11, wherein the second message includes a link to a database of encrypted cipertext messages.

17. The system of claim 11, further comprising a decryption program that will selectively decrypt and display the first message.

\* \* \* \* \*